US012116007B2

(12) United States Patent
Russell et al.

(10) Patent No.: US 12,116,007 B2
(45) Date of Patent: Oct. 15, 2024

(54) TRAJECTORY LIMITING FOR AUTONOMOUS VEHICLES

(71) Applicant: Waymo LLC, Mountain View, CA (US)

(72) Inventors: Jared Russell, San Francisco, CA (US); Jens-Steffen Gutmann, Cupertino, CA (US); Ioan-Alexandru Sucan, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 147 days.

(21) Appl. No.: 17/116,422

(22) Filed: Dec. 9, 2020

(65) Prior Publication Data

US 2022/0176987 A1 Jun. 9, 2022

(51) Int. Cl.
*B60W 60/00* (2020.01)
*B60W 30/08* (2012.01)
*G01C 21/36* (2006.01)
*G06V 20/58* (2022.01)

(52) U.S. Cl.
CPC .......... *B60W 60/001* (2020.02); *B60W 30/08* (2013.01); *G01C 21/3602* (2013.01); *G06V 20/582* (2022.01); *G06V 20/584* (2022.01); *B60W 2030/082* (2013.01); *B60W 2420/408* (2024.01); *B60W 2554/4049* (2020.02)

(58) Field of Classification Search
CPC .... B60W 30/08; B60W 30/09; B60W 30/095; B60W 30/0953; B60W 30/0956; B60W 2030/082; B60W 50/0097; B60W 60/001; B60W 60/0011; B60W 60/0027; B60W 60/00272; B60W 60/00274; B60W 60/0015; B60W 60/0016; B60W 2420/52; B60W 2520/04; B60W 2510/18; B60W 2510/20; B60W 2554/40; B60W 2554/4041; B60W 2554/4049; B60W 2554/20; G06V 20/56; G06V 20/58; G06V 20/582; G06V 20/584; G08G 1/16; G08G 1/166; G01C 21/3602; G01C 21/34
See application file for complete search history.

(56) References Cited

U.S. PATENT DOCUMENTS 10,691,130 B2 6/2020 Phillips et al.
11,008,009 B2 * 5/2021 Oguro ................. B60W 30/162
11,237,564 B2 * 2/2022 Wilkinson ........ B60W 30/0956
(Continued)

FOREIGN PATENT DOCUMENTS

WO 2019231455 A1 12/2019

*Primary Examiner* — Russell Frejd
*Assistant Examiner* — Brandon Z Willis
(74) *Attorney, Agent, or Firm* — Botos Churchill IP Law (57) ABSTRACT

Aspects of the disclosure provide a method of generating and following planned trajectories for an autonomous vehicle. For instance, a baseline for a planned trajectory that the autonomous vehicle can use to follow a route to a destination may be determined. A stopping point corresponding to a traffic control that will cause the autonomous vehicle to come to a stop using the baseline may be determined. Sensor data identifying objects and their locations may be received. A plurality of constraints may be generated based on the sensor data. A planned trajectory may be generated using the baseline, the stopping point, and the plurality of constraints, wherein constraints beyond the stopping point are ignored.

20 Claims, 8 Drawing Sheets

(56) References Cited

U.S. PATENT DOCUMENTS

| | | | |
|---|---|---|---|
| 11,390,300 B2* | 7/2022 | Phillips | B60W 60/0011 |
| 11,433,885 B1* | 9/2022 | Beller | B60W 30/095 |
| 2016/0375901 A1* | 12/2016 | Di Cairano | G01C 21/34 |
| | | | 701/26 |
| 2019/0220015 A1 | 7/2019 | Phillips et al. | |
| 2019/0291726 A1 | 9/2019 | Shalev-Shwartz et al. | |
| 2020/0031335 A1* | 1/2020 | Ohmura | B60W 50/082 |
| 2021/0101625 A1* | 4/2021 | Shrestha | B60W 60/00272 |
| 2021/0116916 A1* | 4/2021 | He | G05D 1/0214 |

* cited by examiner

TRAJECTORY LIMITING FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings. This information is then used to generate planned trajectories in order to allow the vehicle to navigate through the world while avoiding collisions with other objects.

A trajectory may include a geometry component which identifies the locations at which an object will be located as well as a speed component which identifies the speeds, accelerations/decelerations, and rates of deceleration/acceleration that an autonomous vehicle can use to follow a route. Trajectory planning for autonomous vehicles is often computationally expensive for a number of reasons including, for example, that the trajectory is long enough to ensure that the autonomous vehicles safely avoids all objects and obstacles and can come to a stop, the trajectory may take into account predicted responses or behaviors of other objects to the autonomous vehicle's behavior, the trajectory must be consistent with all of the dynamic constraints of the vehicle (e.g. acceleration and deceleration limits, etc.), and for safety reasons should be put through both collision and proximity analysis with respect to all objects and their predicted locations.

BRIEF SUMMARY

Aspects of the disclosure provide a method of generating and following planned trajectories for an autonomous vehicle. The method includes determining a baseline for a planned trajectory that the autonomous vehicle can use to follow a route to a destination; determining a stopping point corresponding to a traffic control that will cause the autonomous vehicle to come to a stop using the baseline; receiving sensor data identifying objects and their locations; generating a plurality of constraints based on the sensor data; and generating a planned trajectory using the baseline, the stopping point, and the plurality of constraints, wherein constraints beyond the stopping point are ignored.

In one example, the baseline includes a nominal path that traverses one or more lanes of a road in a sequence in accordance with the route. In another example, the traffic control is a stop sign. In another example, the traffic control is a traffic signal light. In another example, generating the planned trajectory includes limiting a length of the planned trajectory based on the stopping point. In this example, generating the planned trajectory includes adjusting the stopping point using a buffer amount. In addition, the buffer amount corresponds to an error in the planned trajectory. Alternatively, the buffer amount corresponds to an error in the baseline. In another example, generating the planned trajectory includes ending the planned trajectory at the stopping point. In another example, generating the plurality of constraints is further based on the stopping point, such that the plurality of constraints does not include constraints beyond the stopping point and are therefore ignored when generating the planned trajectory. In another example, the method also includes performing collision evaluation for the objects on the planned trajectory, and the collision evaluation does not go beyond the stopping point. In another example, the method also includes performing proximity analysis for the objects on the planned trajectory, and the proximity analysis does not go beyond the stopping point. In another example, the method also includes controlling the autonomous vehicle autonomously according to the planned trajectory.

Another aspect of the disclosure provides a system for generating and following planned trajectories for an autonomous vehicle. The system includes a computing device including one or more processors configured to determine a baseline for a planned trajectory that the autonomous vehicle can use to follow a route to a destination; determine a stopping point corresponding to a traffic control that will cause the autonomous vehicle to come to a stop using the baseline; receive sensor data identifying objects and their locations; generate a plurality of constraints based on the sensor data; and generate a planned trajectory using the baseline, the stopping point, and the plurality of constraints, wherein constraints beyond the stopping point are ignored.

In one example, the baseline includes a nominal path that traverses one or more lanes of a road in a sequence in accordance with the route. In another example, the one or more processors are further configured to generate the planned trajectory includes limiting a length of the planned trajectory based on the stopping point. In another example, the one or more processors are further configured to generate the planned trajectory by adjusting the stopping point using a buffer amount. In another example, the one or more processors are further configured to generate the plurality of constraints is further based on the stopping point, such that the plurality of constraints does not include constraints beyond the stopping point and are therefore ignored when generating the planned trajectory. In another example, the one or more processors are further configured to perform collision evaluation for the objects on the planned trajectory, wherein the collision evaluation does not go beyond the stopping point. In another example, the one or more processors are further configured to perform proximity analysis for the objects on the planned trajectory, wherein the proximity analysis does not go beyond the stopping point.

DETAILED DESCRIPTION

Overview

The technology relates to planning trajectories for autonomous vehicles. A trajectory may include a geometry component which identifies the locations at which an object will be located as well as a speed component which identifies the speeds, accelerations/decelerations, and rates of deceleration/acceleration that an autonomous vehicle can use to follow a route. In this regard, planned trajectories may be limited in time to a few seconds, such as 10 seconds or more or less. Trajectory planning for autonomous vehicles is often computationally expensive for a number of reasons including, for example, that the planned trajectory is long enough to ensure that the autonomous vehicles safely avoids all objects and obstacles and can come to a stop, the planned trajectory must be consistent with all of the dynamic constraints of the vehicle (e.g. acceleration and deceleration limits, etc.), and for safety reasons should be put through both collision and proximity analysis with respect to all objects and their predicted locations. As such, techniques which may reduce the number of computations while also not compromising safety can be critically important.

In order to generate a planned trajectory, the vehicle's routing system must first determine a route to a destination of the vehicle. This route may be determined as described above. The route may include the simple geometric path including turns, merges, lane changes, etc. that the vehicle can follow from the vehicle's current location to the vehicle's destination.

When generating a planned trajectory, the planning system may select a baseline geometry. This baseline geometry may be a nominal path that traverses one or more lanes of the road in a sequence in accordance with a route to a destination of the autonomous vehicle. In addition, the vehicle's computing devices may determine how long a planned trajectory needs to be by identifying a stopping point or a stopping location for the autonomous vehicle along the baseline.

As the autonomous vehicle moves through its environment, the vehicle's perception system may detect and identify objects in the vehicle's environment. The perception system may determine characteristics for each object including location, type, heading, orientation, speed, acceleration, change in acceleration, size, shape, etc. This information may be input into a behavior prediction system software module of a behavior modeling system in order to determine a predicted trajectory for the road user object.

A plurality of constraints for avoiding collisions or proximity with other road user objects, responding to traffic signals, speed or other control limits, etc. may then be generated based on the sensor data and the predicted trajectories. For instance, the baseline may be used to determine a speed plan which the autonomous vehicle can follow while satisfying (e.g. avoiding or falling within) all of the constraints. However, before publishing a planned trajectory for use by other systems of the vehicle, the vehicle's computing devices may perform collision evaluation and proximity analysis for the planned trajectory and any road user objects detected in the sensor data.

When an autonomous vehicle is driving generally, coming to a stop, planning to stop, or stopped, its computing devices may continuously generate new constraints and check its current trajectory for potential collisions (collision analysis) or coming too close to another road user object even if not actually a collision (proximity analysis). For example, when a vehicle is stopped at a busy intersection, the vehicle's computing devices will continuously attempt to analyze the paths of the cross-traffic vehicles for collision evaluation and proximity analysis when generating planned trajectory.

To avoid such situations, certain processes and/or the planned trajectory may be "cut off" at the end of a planned trajectory or whenever a vehicle will be stopped. However, precisely how long the planned trajectory needs to be before the vehicle will stop may initially be unknown. As such, the length of the planned trajectory may be limited based on the stopping point. Alternatively, the planned trajectory may be just as long as the baseline, but any constraints, collision evaluation and proximity analysis beyond the stopping point can be ignored or need not even be calculated. Once the collision evaluation and proximity analysis are completed, a planned trajectory may be published by the planning system to the other systems of the autonomous vehicle.

The features described herein may reduce the number of computations required for trajectory planning while also not compromising safety can be critically important. For instance, in many situations (especially in dense urban environments where there are large numbers of both traffic signals/stop signs and other vehicles) the features described herein may be used to solve for shorter planned trajectories, thus saving computation. The savings are actually even better than just the percentage reduction of planned trajectory length when the portion of the planned trajectory "cut off" at the attention limiting constraint has lots of vehicle cross traffic (which would otherwise have a higher computational cost for collision checking). Moreover, by utilizing the baseline as a prior estimate for a planned trajectory, there may be fewer differences between the baseline and the planned trajectory. This, in turn, may tend to reduce the complexity of the search and optimizations processes of planned trajectory generation.

EXAMPLE SYSTEMS

Figure 1:
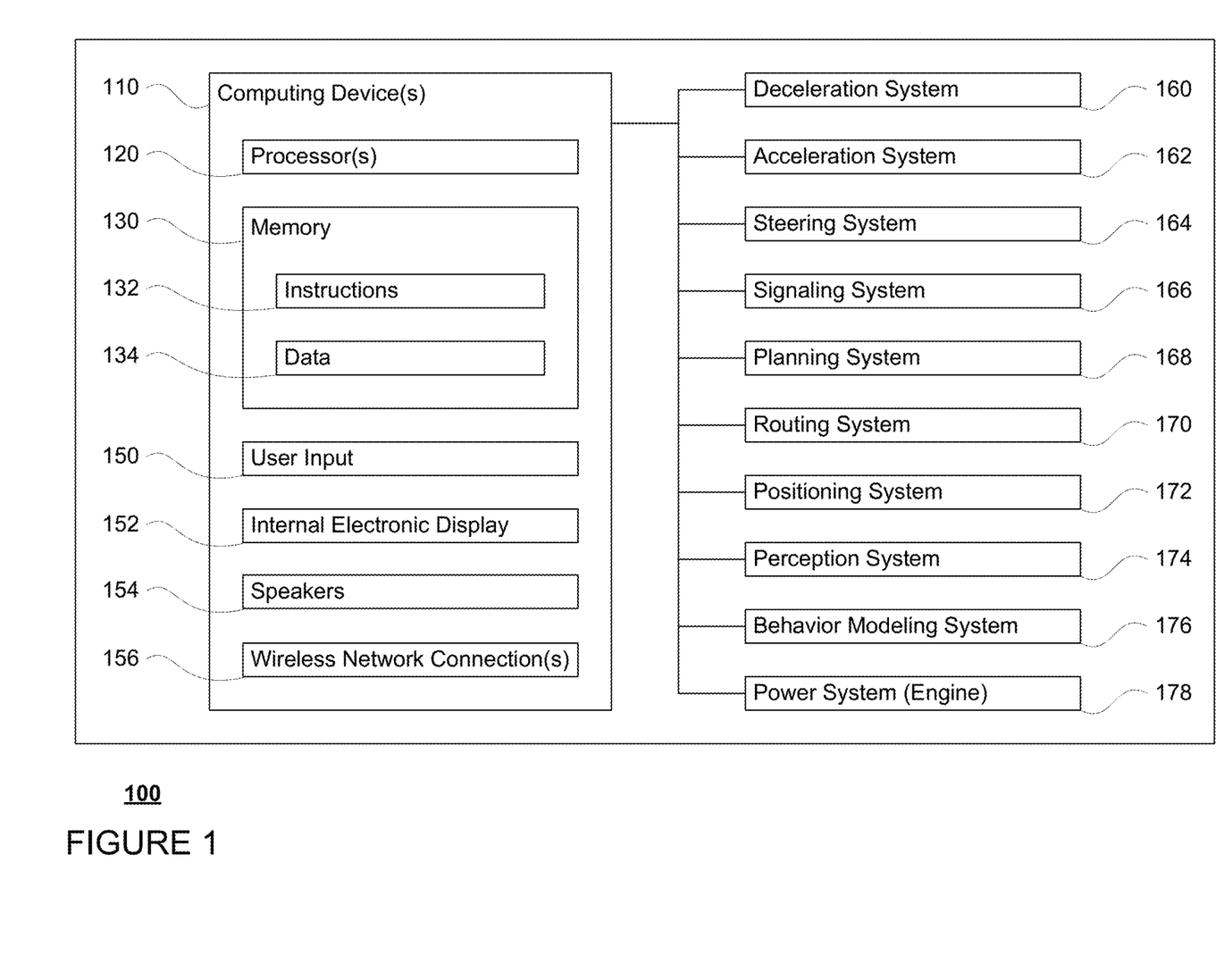
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein.

The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, 12 ML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various displays 152 (e.g., a monitor having a screen or any other electrical device that is operable to display information), and speakers 154 to provide information to a passenger of the vehicle 100 as needed. For example, displays 152 may be located within a cabin of vehicle 100 and may be used by computing devices 110 to provide information to passengers within the vehicle 100. The displays 152 may be located on an exterior of the vehicle, such as mounted on the roof or at some other portion of the vehicle. In addition or alternatively, the displays 152 may be in an interior location which allows persons outside of the vehicle to view information presented on the displays 152, such as a display mounted at the center of a dashboard of the vehicle and oriented outwards. In some instances, the displays 152 may be flat, curved, and may extend 360 degrees. As discussed in further detail below, the computing devices 110 in combination with display 152 and/or speakers 154 may be a notification system which can provide information to passengers as well as other persons outside of the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may function as an autonomous control system, and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 170, planning system 168, positioning system 172, and perception system 174 in order to control the movement, speed, etc. of vehicle 100 in accordance with the instructions 134 of memory 130 in the autonomous driving mode.

As an example, a computing device of the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights of the vehicle when needed.

Routing system 170 may be used by the computing devices 110 in order to generate a route to a destination. Planning system 168 may be used by computing device 110 in order to follow the route. In this regard, the planning system 168 and/or routing system 170 may store detailed map information, e.g., highly detailed maps identifying a road network including the shape and elevation of roadways, lane lines, intersections, crosswalks, speed limits, traffic signals, buildings, signs, real time traffic information, pull-over spots, vegetation, or other such objects and information.

Figure 2:
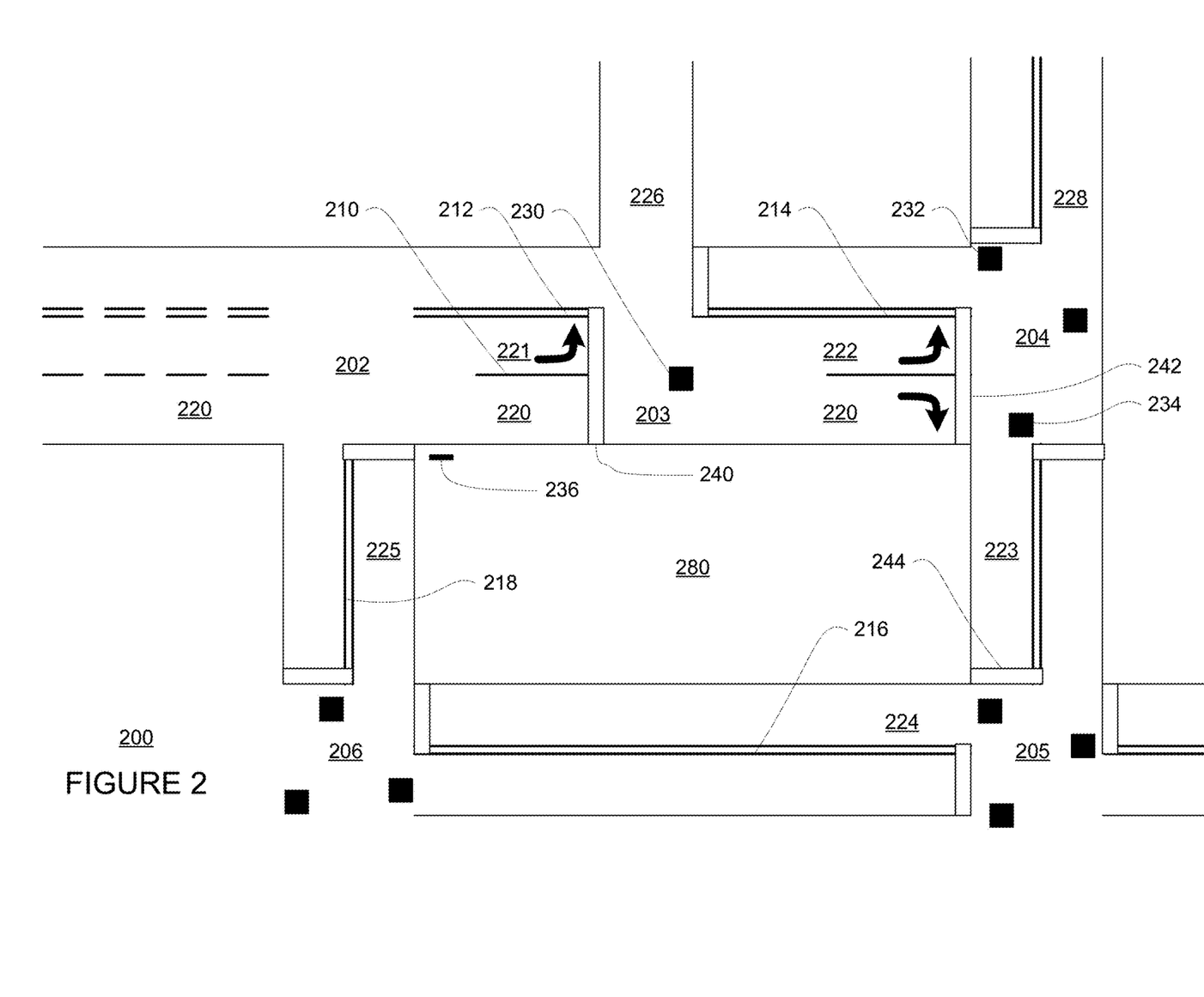
FIG. 2 is an example of map information in accordance with aspects of the disclosure.

FIG. 2 is an example of map information 200 for a small section of roadway including intersections 202, 203, 204, 205, 206. FIG. 2A depicts a portion of the map information 200 that includes information identifying the shape, location, and other characteristics of lane markers or lane lines 210, 212, 214, 216, 218, lanes 220, 221, 222, 223, 224, 225, 226, 228, traffic control devices including traffic signal lights 230, 232, 234 and stop sign 236, stop lines 240, 242, 244, as well as a non-drivable area 280. In this example, lane 221 approaching intersection 204 is a left turn only lane, lane 222 approaching intersection 206 is a left turn only lane, and lane 226 is a one-way street where the direction of traffic moves away from intersection 204. In addition to the aforementioned features, the map information may also include information that identifies the direction of traffic for each lane as well as information that allows the computing devices 110 to determine whether the vehicle has the right of way to complete a particular maneuver (i.e. complete a turn or cross a lane of traffic or intersection).

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speed limits may correspond to greater distances between graph nodes.

The routing system 170 may use the roadgraph to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 172 may be used by computing devices 110 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
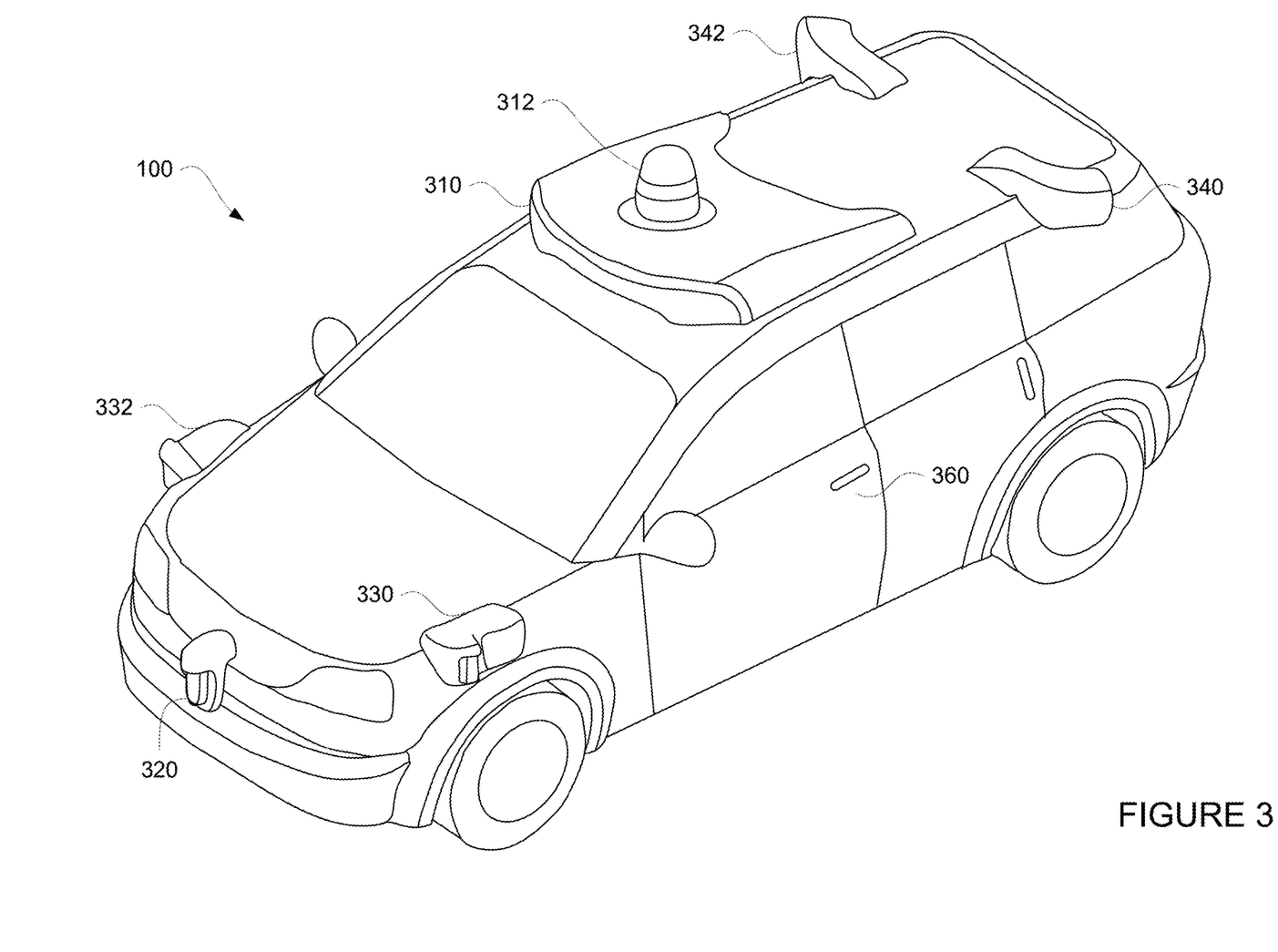
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 170, planning system 168, positioning system 172, perception system 174, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of a behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. In this regard, the planned trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a planned trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 172 to determine the vehicle's location and perception system 174 to detect and respond to objects when needed to reach the location safely. Again, in order to do so, computing device 110 and/or planning system 168 may generate planned trajectories and cause the vehicle to follow these planned trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
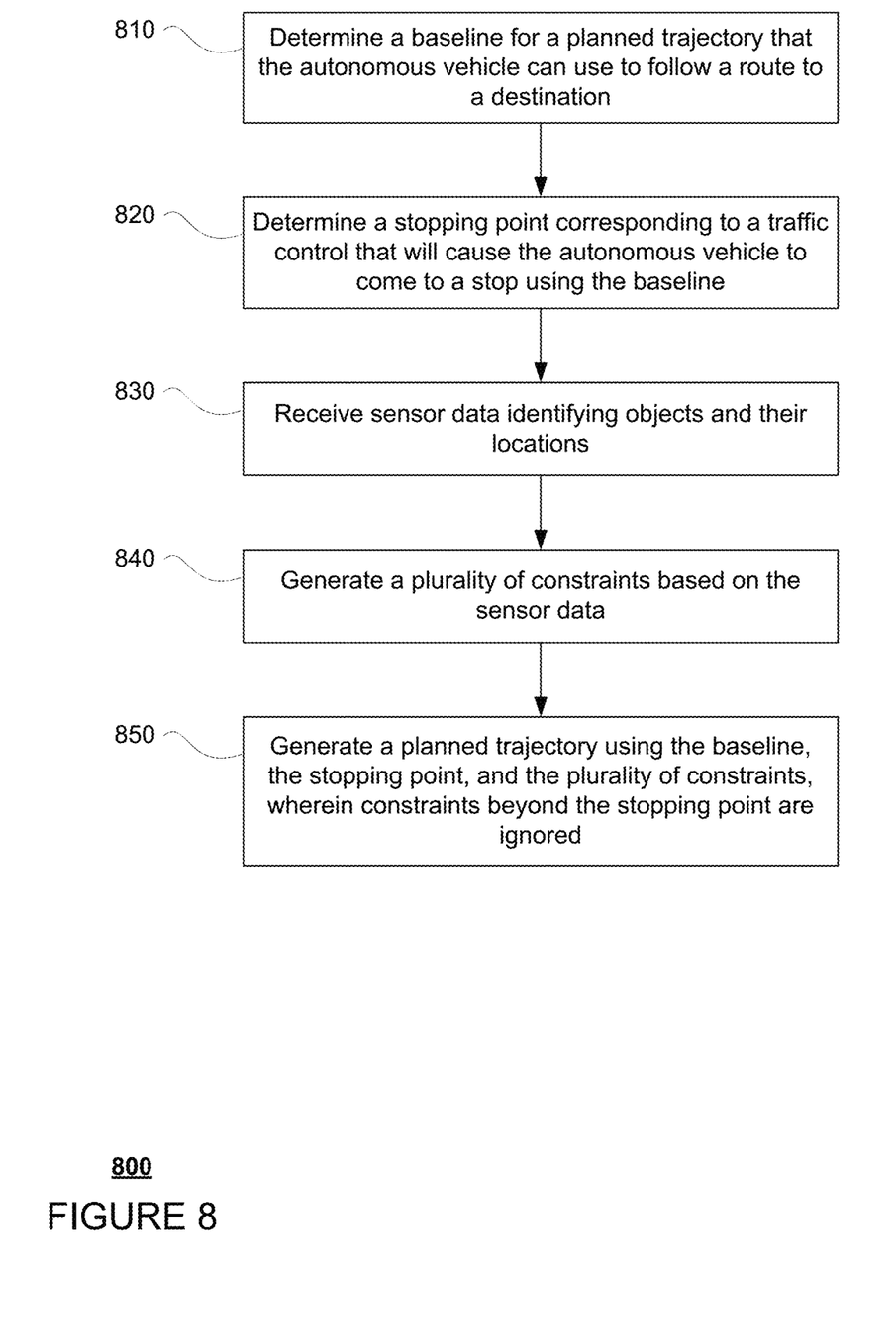
FIG. 8 is an example flow diagram in accordance with aspects of the disclosure.

FIG. 8 is an example flow diagram 800 for generating and following planned trajectories for an autonomous vehicle which may be performed by one or more processors of one or more computing devices such as the processors 120 of the computing devices 110, processors of computing devices of the planning system 168, and/or processors of another system of the vehicle 100. The planned trajectory identifies locations and times when the vehicle will be at those locations. At block 810, a baseline for a planned trajectory that the autonomous vehicle can use to follow a route to a destination is determined.

Figure 4:
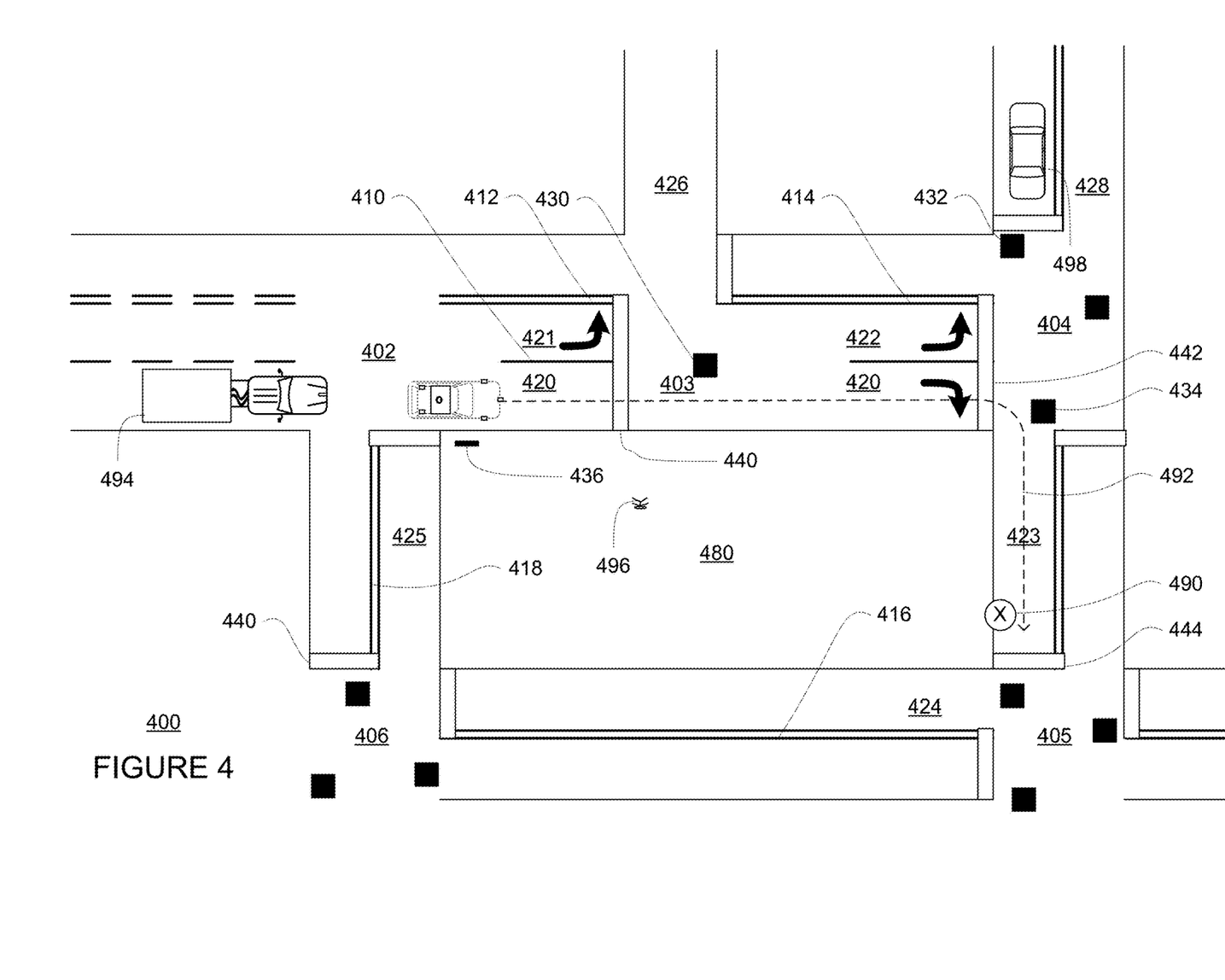
FIG. 4 is an example of vehicle driving through the geographic area corresponding to the area of the map information depicted in FIG. 2.

In order to determine a baseline, the vehicle's routing system must first determine a route to a destination of the vehicle. This route may be determined as described above. The route may include the simple geometric path including turns, merges, lane changes, etc. that the vehicle can follow from the vehicle's current location to the vehicle's destination. FIG. 4 is an example of vehicle 100 driving through a geographic area 400 corresponding to the area of the map information 200 depicted in FIG. 2. In this example, the shape, location and other characteristics of intersections 402, 403, 404, 405, 406 correspond to intersections 202, 203, 204, 205, 206, the shape, location and other characteristics of lane lines 410, 412, 414, 416, 418 correspond to lane lines 210, 212, 214, 216, 218, the shape, location and other characteristics of lanes 420, 421, 422, 423, 424, 425, 426, 428 correspond to lanes 220, 221, 222, 223, 224, 225, 226, 228, the shape, location and other characteristics of traffic control devices including traffic signal lights 430, 432, 434 and stop sign 436 correspond to traffic signal lights 230, 232, 234 and stop sign 236, the shape, location and other characteristics of stop lines 440, 442, 444 correspond to stop lines 240, 242, 244, and the shape, location and other characteristics of area 480 correspond to non-drivable area 280. In this example, vehicle 100 is in lane 420 approaching intersection 403 and is traveling towards a destination 490.

As such, the routing system 170 may generate a route 492 from vehicle 100's current location to the destination 490 as described above. The route may require the vehicle 100 to traverse the intersection 403 and make a right turn at the intersection 404 into lane 423 in order to reach the destination 490. The route may be "published," that is provided by the routing system to other systems of the vehicle 100, including the computing devices 110, planning system 168, etc.

Figure 5:
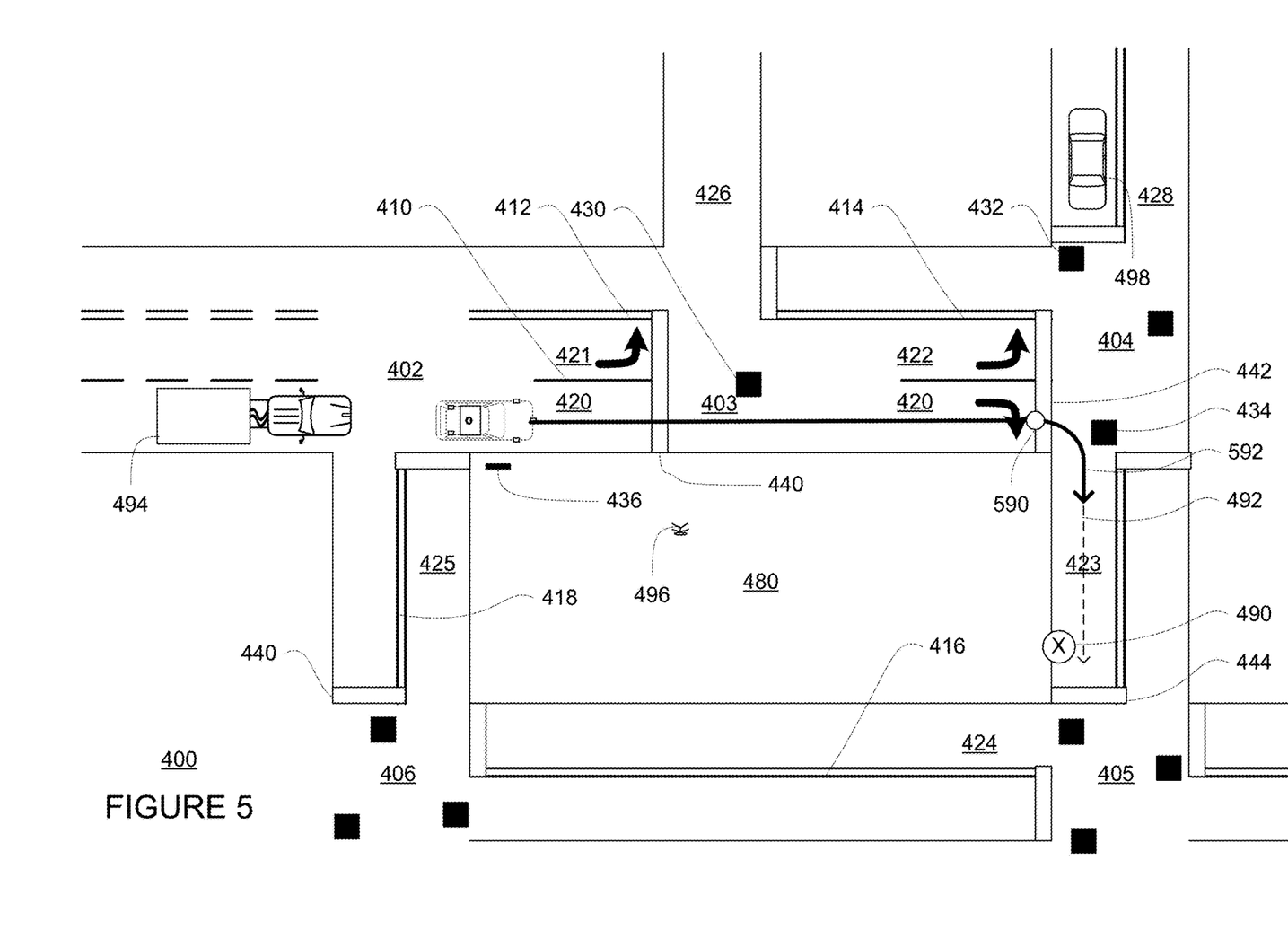
FIG. 5 is an example of a baseline for a trajectory in accordance with aspects of the disclosure.

When generating a planned trajectory, the planning system may select a baseline geometry. This baseline geometry may be a nominal path that traverses one or more lanes of the road in a sequence in accordance with a route to a destination of the autonomous vehicle. In this regard, the baseline does not account for the vehicle's speed or maneuvering (e.g. shifting) within a lane. In this regard, the baseline may be the "most efficient" path to follow the route, and may thus be a preferred geometry for the autonomous vehicle to follow. FIG. 5 provides an example of a baseline 592 that corresponds to a portion of the route 492. In one example, the baseline may extend from the vehicle's current position until either the destination point or at least some minimum distance that is sufficiently large to ensure that the vehicle will not overrun it during trajectory planning, for example, enough for at least 15 seconds or more or less of driving at the posted speed limit.

Returning to FIG. 8, at block 820, a stopping point corresponding to a traffic control that will cause the autonomous vehicle to come to a stop using the baseline is determined. To do so, the planning system 168 and/or the vehicle's computing devices 110 may determine how long a planned trajectory needs to be. For instance, the baseline may be used to determine which constraints can be used to "cut off" the planned trajectory at a stopping point. In this regard, the baseline may be used which traffic controls are relevant to a planned trajectory generated using the baseline. This may involve conducting a search through map information to identify which traffic control devices, such as stop signs, yield signs, red traffic signal lights, etc. which would result in the autonomous vehicle coming to a stop. The first traffic control device along the baseline which would result in the autonomous vehicle coming to a stop may be used to determine a stopping point or a stopping location for the autonomous vehicle along the baseline.

As an example, turning to the example of FIG. 5, the vehicle may not need to stop at the intersection 403, presumably because the vehicle 100 will be expected to have a green light at the traffic signal light 430 when the vehicle 100 reaches the intersection 403. However, the vehicle 100 may be expected to have to stop at the intersection 404 because the vehicle 100 will be expected to encounter a red traffic signal light at traffic signal light 434 when the vehicle reaches the intersection 404. In this regard, a stopping point 590 is located before the intersection 404 (e.g. at or immediately before the stop line 442).

Returning to FIG. 8, at block 830, sensor data identifying objects and their locations is received. For instance, as the vehicle 100 moves through its environment, the vehicle's perception system 174 may detect and identify objects in the vehicle's environment. As noted above, the perception system 174 may determine characteristics for each object including location, type, heading, orientation, speed, acceleration, change in acceleration, size, shape, etc. This information may be "published," that is provided by the perception system to other systems of the vehicle 100, including the computing devices 110, planning system 168, and behavior modeling system 176. In this regard, the computing devices 110 and/or planning system 168 may receive the characteristics for each object from the perception system 174. For example, returning to FIG. 4, the perception system 174 may detect and identify the features and characteristics of a plurality of objects including road user objects such as truck 494, pedestrian 496, and car 498 and provide this information to the computing devices 110, planning system 168, and behavior modeling system 176.

In some instances, such as for road user objects like pedestrians, bicyclists, motorcyclists, cars, trucks, etc. the published characteristics of these road user objects may be input into a behavior prediction system software module of a behavior modeling system 176. The behavior modeling system 176 may use various behavior models based on object type to output a predicted future behavior for a detected object. This predicted future behavior may include a predicted trajectory for the road user object identifying a predicted location, heading, orientation, speed, acceleration, and change in acceleration at different points in time.

Figure 6:
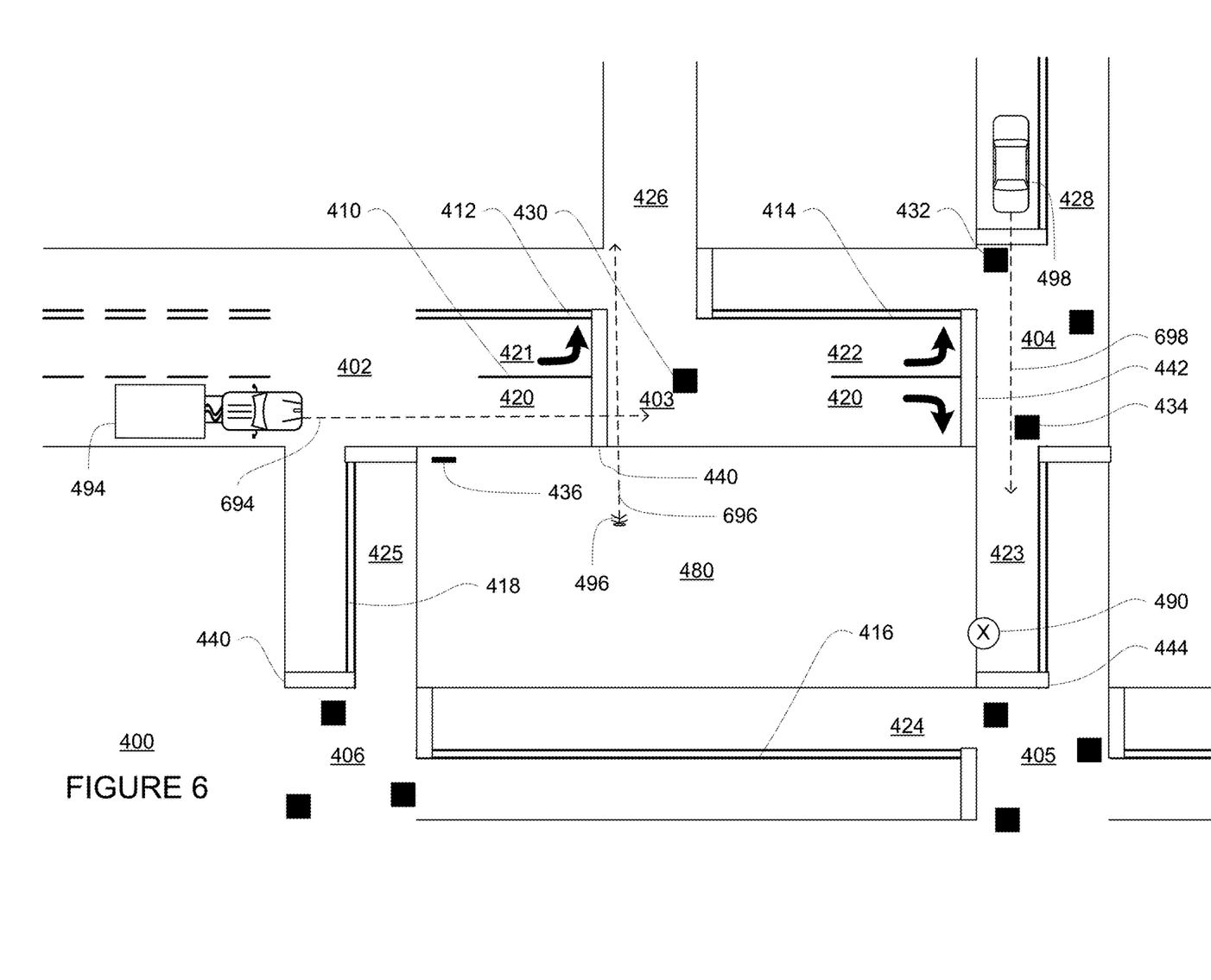
FIG. 6 is an example of behavior predictions for objects in accordance with aspects of the disclosure.

In this regard, the behavior modeling system 176 may generate behavior predictions, or predicted trajectories, for each of a plurality of road user objects including the road user objects truck 494, pedestrian 496, and car 498. Turning to FIG. 6, each of the truck 494, pedestrian 496, and car 498 is depicted with a predicted trajectory 694, 696, 698, respectively. This information may also be "published," that is provided by the behavior modeling system 176 to other systems of the vehicle 100, including the computing devices 110 and planning system 168. In this regard, the computing devices 110 and/or planning system 168 may receive the predicted trajectories 694, 696, 698 from the behavior modeling system 176.

Returning to FIG. 8, at block 840, a plurality of constraints is generated based on the sensor data. The plurality constraints may be determined generated based on the sensor data and the predicted trajectories avoid collisions and coming too close with other road user objects as well as to ensure that the vehicle is appropriately responding to traffic signals, speed or other control limits, etc. As an example, when the perception system detects a road user object, the behavior modeling system may generate a predicted trajectory for such objects as described above. These predicted trajectories may be used as constraints which the autonomous vehicle must avoid by speeding up or slowing down. In this regard, the baseline may be adjusted in order to generate a planned trajectory for the vehicle.

As an example, constraints for other objects may essentially mark regions of the world as "occupied" at discrete moments in time and/or during some intervals of time (e.g. during a portion of a second or more or less). In this regard, the planning system 168 may identify these areas as having a high cost of being occupied at the discrete moments in time and/or during some intervals of time. In this regard, "occupied" could be a binary yes/no or alternatively a more continuous notion of cost corresponding to how likely the object is to be in that area based on the behavior prediction for that object. The planning system 168 may then conduct a search and optimization (initialized to the baseline) to try to drive such costs to zero, similar to the cost-based analysis described above with regard to the routing system.

Returning to FIG. 8, at block 850, a planned trajectory is generated using the baseline, the stopping point, and the plurality of constraints, and constraints beyond the stopping point are ignored. The planning system 168 may use information published by the perception system 174, routing system 170, the behavior modeling system 176 and other systems of the vehicle to generate planned trajectories for the vehicle to follow in order to follow the route to the destination as described above. In order to improve the safety of the vehicle 100, before "publishing" a planned trajectory to cause the vehicle to be controlled according to the planned trajectory, the planned trajectory may be evaluated to ensure that it will not result in a collision.

For instance, the baseline may be used to determine a speed plan which the autonomous vehicle can follow while satisfying (e.g. avoiding or falling within) all of the constraints. This may involve starting with the fastest speed the vehicle is able to go and reducing speed as needed to avoid the constraints. If it is not possible to solve for a planned trajectory that satisfies all of the constraints, the geometry of the baseline may be adjusted and the process repeated as needed until a planned trajectory that satisfies all of the constraints can be found. However, before publishing a planned trajectory for use by other systems of the vehicle 100, the planning system and/or the computing devices 110 may perform collision evaluation and proximity analysis for the planned trajectory and any road user objects detected in the sensor data.

The collision evaluation and proximity analysis may essentially be redundancy checks to safeguard against bugs, other issues with the planning system, or new objects that were not previously detected when the trajectory was generated. In this regard, the collision evaluation and proximity analysis may use the most current constraints as noted below. Other redundancy checks including ensuring commanded controls (e.g. commands for the acceleration, declaration, steering systems, etc.) are within bounds, validations that all relevant objects have been considered (nothing "fell through the cracks"), etc., may also be performed at this time. If the collision evaluation or proximity analysis for a given planned trajectory indicates that the vehicle would collide with or come too close to a road user object, the planning system would attempt to solve for a new planned trajectory, discarding the given planned trajectory.

Figure 7:
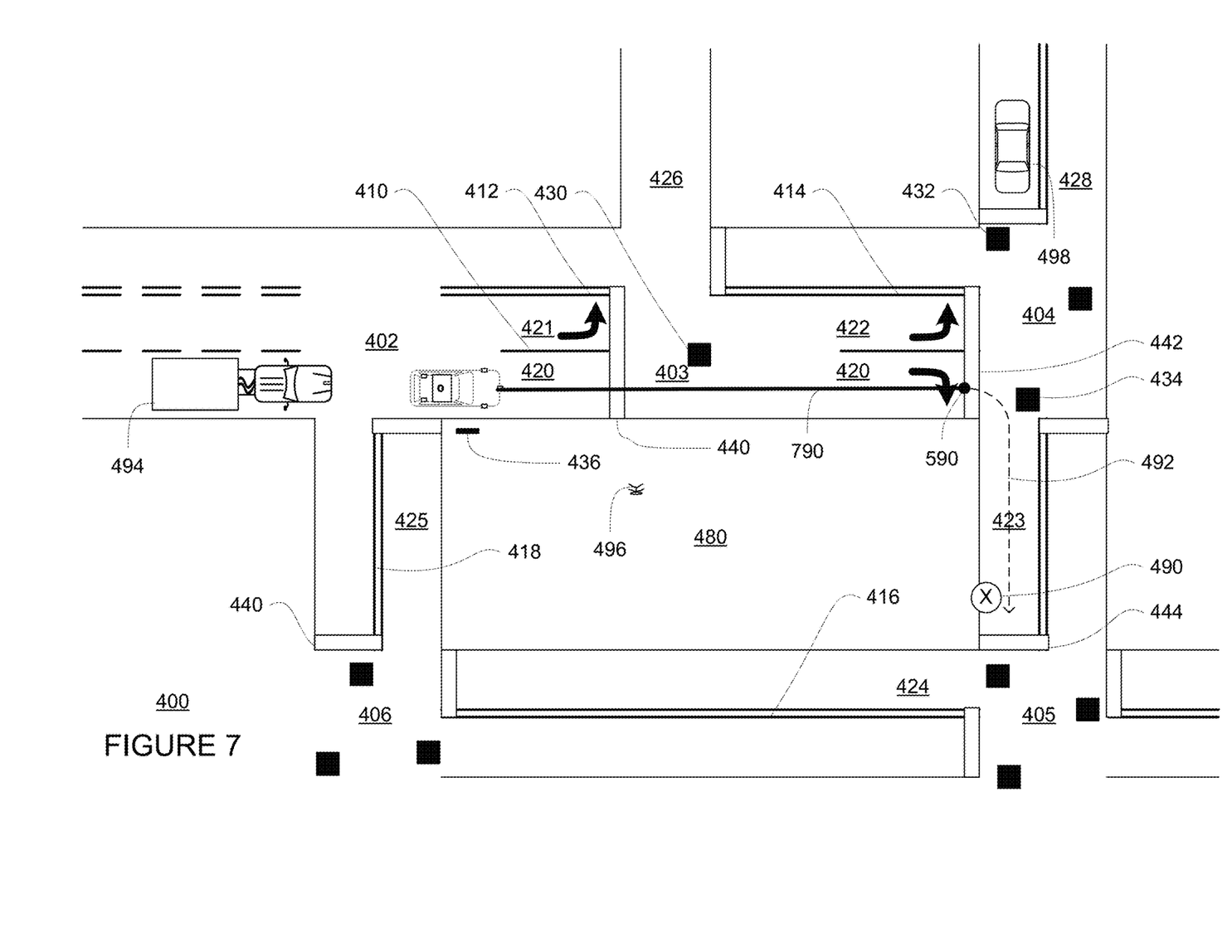
FIG. 7 is an example of a planned trajectory in accordance with aspects of the disclosure.

FIG. 7 depicts an example planned trajectory 790 for the vehicle 100 where the vehicle proceeds through the intersection 403 and stops at the intersection 404. Again, before being published or rather, before using the planned trajectory to control the vehicle as described above, the planned trajectory 790 may be evaluated to ensure that it will not result in a collision with or coming too close to any of the road user objects detected by the perception system 174.

When an autonomous vehicle is driving generally, coming to a stop, planning to stop, or stopped, its computing devices may continuously generate new constraints. These new constraints can be used to check its current trajectory for potential collisions (collision analysis) or coming too close to another road user object even if not actually a collision (proximity analysis), even when these new constraints were not used to generate the current trajectory. For example, when a vehicle is stopped at a busy intersection, the vehicle's computing devices will continuously attempt to analyze the paths of the cross-traffic vehicles for collision evaluation and proximity analysis when generating planned trajectories and before publishing those trajectories. In addition, the other redundancy checks may also be performed.

To avoid such situations, certain processes and/or the planned trajectory may be "cut off" at the end of a planned trajectory or whenever a vehicle will be stopped. However, precisely how long the planned trajectory needs to be before the vehicle will stop may initially be unknown. For example, if the vehicle needed to stop in 3 seconds, the planning system could generate a 3-second-long planned trajectory, but knowing that the vehicle needs to stop in 3 seconds typically is only possible once the planned trajectory is known.

As such, the length of the planned trajectory may be limited based on the stopping point. In other words, the planned trajectory may be generated to end at the stopping point. For example, as shown in FIG. 7, the planned trajectory 790 ends at the stopping point 590. Alternatively, the planned trajectory may be just as long as the baseline (e.g. the planned trajectory may extend the length of baseline 592 as shown in FIG. 5), but any constraints, collision evaluation and proximity analysis beyond the stopping point can be ignored or need not even be calculated. To implement this, whenever a planned trajectory includes a stopping point, an "attention-limiting" constraint may be added at the stopping point to cause the autonomous vehicle's computing devices to ignore constraints, collision evaluation and proximity analysis beyond the stopping point. In other words, the planning system 168 would not need to consider constraints beyond the stopping point 590, such as constraints related to the car 498 and predicted trajectory 698, and any collision evaluation and proximity analysis for other road users would not go beyond the stopping point. In this regard, there need not be any collision evaluation, proximity analysis, or other redundancy checks for the car 498 and predicted trajectory 698. Thus, this may save a significant amount of computational power, especially when the vehicle is coming to a stop, planning to stop, or stopped at busy intersections as described above.

Once the collision evaluation and proximity analysis are completed (and do not indicate that there will be a collision or that the vehicle will come too close to another road user object), a planned trajectory may be published by the planning system to the other systems of the vehicle 100. In this regard, the autonomous vehicle may be controlled autonomously according to the planned trajectory as described above.

In some instances, the stopping point and/or the length of the planned trajectory may be shifted by a buffer amount when generating the attention-limiting constraint. This buffer amount may be used to accommodate any differences between the planned trajectory and the physical location where the vehicle comes to a stop. In this regard, the buffer amount may correspond to an error in the baseline and/or planned trajectory.

While the features described herein relate to bifurcated trajectory planning (e.g. planning geometry and speed separately), similar features may also be used for trajectory planning that solves for geometry and speed in one step.

The features described herein may reduce the number of computations required for trajectory planning while also not compromising safety can be critically important. For instance, in many situations (especially in dense urban environments where there are large numbers of both traffic signals/stop signs and other vehicles) the features described herein may be used to solve for shorter planned trajectories, thus saving computation. The savings are actually even better than just the percentage reduction of planned trajectory length when the portion of the planned trajectory "cut off" at the attention limiting constraint has lots of vehicle cross traffic (which would otherwise have a higher computational cost for collision checking). Moreover, by utilizing the baseline as a prior estimate for a planned trajectory, there may be fewer differences between the baseline and the planned trajectory. This, in turn, may tend to reduce the complexity of the search and optimizations processes of planned trajectory generation.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of generating and following planned trajectories for an autonomous vehicle, the method comprising:
   determining a baseline for a planned trajectory that the autonomous vehicle can use to follow a route to a destination;
   determining a stopping point corresponding to a traffic control that will cause the autonomous vehicle to come to a stop using the baseline;
   receiving sensor data identifying objects and their locations, the objects being in an environment of the autonomous vehicle and at least one of the objects located beyond the stopping point;
   generating a plurality of constraints based on the sensor data, the plurality of constraints including constraints related to the autonomous vehicle and constraints related to each of the objects; and
   generating the planned trajectory by adjusting the baseline, and using the stopping point and the plurality of constraints, wherein any of the plurality of constraints beyond the stopping point are ignored.

2. The method of claim 1, wherein the baseline includes a nominal path that traverses one or more lanes of a road in a sequence in accordance with the route.

3. The method of claim 1, wherein the traffic control is a stop sign.

4. The method of claim 1, wherein the traffic control is a traffic signal light.

5. The method of claim 1, wherein generating the planned trajectory includes limiting a length of the planned trajectory based on the stopping point.

6. The method of claim 5, wherein generating the planned trajectory includes adjusting the stopping point using a buffer amount.

7. The method of claim 6, wherein the buffer amount corresponds to an error in the planned trajectory.

8. The method of claim 6, wherein the buffer amount corresponds to an error in the baseline.

9. The method of claim 1, wherein generating the planned trajectory includes ending the planned trajectory at the stopping point.

10. The method of claim 1, wherein generating the plurality of constraints is further based on the stopping point, such that the plurality of constraints does not include constraints beyond the stopping point and are therefore ignored when generating the planned trajectory.

11. The method of claim 1, further comprising performing collision evaluation for the objects and the planned trajectory, wherein the collision evaluation does not go beyond the stopping point.

12. The method of claim 1, further comprising performing proximity analysis for the objects and the planned trajectory, wherein the proximity analysis does not go beyond the stopping point.

13. The method of claim 1, further comprising, controlling the autonomous vehicle autonomously according to the planned trajectory.

14. A system for generating and following planned trajectories for an autonomous vehicle, the system comprising:
a computing device including one or more processors configured to:
determine a baseline for a planned trajectory that the autonomous vehicle can use to follow a route to a destination;
determine a stopping point corresponding to a traffic control that will cause the autonomous vehicle to come to a stop using the baseline;
receive sensor data identifying objects and their locations, the objects being in an environment of the autonomous vehicle and at least one of the objects located beyond the stopping point;
generate a plurality of constraints based on the sensor data, the plurality of constraints including constraints related to the autonomous vehicle and constraints related to each of the objects; and
generate the planned trajectory by adjusting the baseline, and using the stopping point and the plurality of constraints, wherein any of the plurality of constraints beyond the stopping point are ignored.

15. The system of claim 14, wherein the baseline includes a nominal path that traverses one or more lanes of a road in a sequence in accordance with the route.

16. The system of claim 14, wherein the one or more processors are further configured to generate the planned trajectory by limiting a length of the planned trajectory based on the stopping point.

17. The system of claim 16, wherein generating the planned trajectory includes adjusting the stopping point using a buffer amount.

18. The system of claim 14, wherein the one or more processors are further configured to generate the plurality of constraints based on the stopping point, such that the plurality of constraints does not include constraints beyond the stopping point and are therefore ignored when generating the planned trajectory.

19. The system of claim 14, the one or more processors are further configured to perform collision evaluation for the objects on the planned trajectory, wherein the collision evaluation does not go beyond the stopping point.

20. The system of claim 14, the one or more processors are further configured to perform proximity analysis for the objects and the planned trajectory, wherein the proximity analysis does not go beyond the stopping point.

* * * * *